Oct. 18, 1966  C. DE VIEUX MUGRIDGE  3,279,430
FILTER AND FEEDER FOR AQUARIUMS
Filed Jan. 6, 1965

INVENTOR
COLIN de VIEUX MUGRIDGE
BY Albert M. Parker
ATTORNEY

3,279,430
FILTER AND FEEDER FOR AQUARIUMS
Colin de Vieux Mugridge, 9 Herbert St., St. Leonards, near Sydney, New South Wales, Australia
Filed Jan. 6, 1965, Ser. No. 423,802
7 Claims. (Cl. 119—3)

This invention relates to a filter and feeder device for aquariums for filtering the circulating water received from a pump or aerator, and at the same time feeding worms from a supply source either in the circulating water apart from the filter or to the bulk of the water volume.

The invention has been specially devised to provide a novel form of filter and feeder device which can be readily supported in or on the aquarium casing or wall structure in a manner whereby it can be removed and the circulating water is effectively filtered and aerated, and at the same time worms can be fed from a source of supply to the fish in a manner in which such worms are readily accessible, and are prevented from damage or deterioration in the process. The device can be readily produced and is both compact and pleasing in appearance and efficiently performs its function. The filtering medium can be easily replaced, and the device removed when required, and quickly cleaned and replaced. The worm feeder can also be used for hatching eggs such as brine shrimp eggs in salt water. Other advantages will be apparent from the following description.

According to this invention, the filter and feeder device consists of a casing of suitable material having an open top, and containing a main filter chamber having at a suitable location a water and air inlet from an aerator or pump and adapted to receive therein a filtering medium in a removable manner, said casing having provision at one or more sides and/or at the top for affixing it to the side or end of an aquarium within same, and towards one end a cross wall with one or more outlet ports in the lower portion, and outwardly of said cross wall between it and that end of the casing a sub-chamber having one or more top overflow ports or openings through which the bulk of the filtered water passes to an end compartment having an overflow outlet or outlets at the end thereof and a number of perforations in the bottom through which worms for feeding purposes can pass, said end compartment forming a feeder for the fish and in some cases an egg hatching compartment.

In certain forms the feeder compartment may be formed as a separate tray affixable in place in any suitable manner.

In some cases the floor of the filter chamber may have ribs or the like therein to raise the filtering medium from said floor.

The floor of the filter chamber may in certain forms have a series of perforations provided therein to provide for restricted flow of filtered water.

Figure 1:
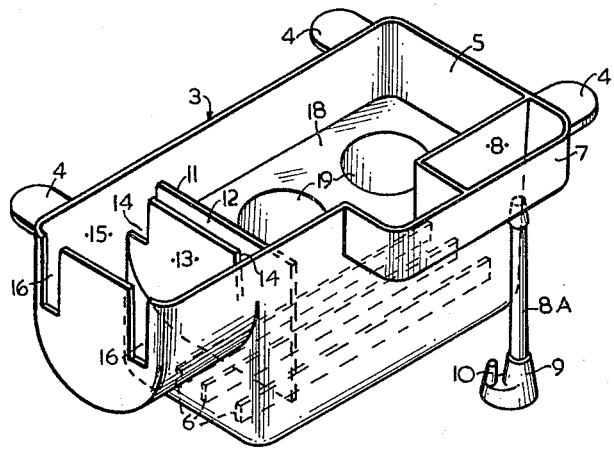
Figure 2:
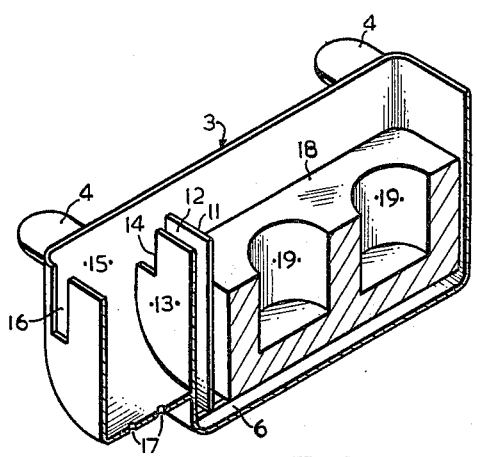

In order to describe the invention more fully reference will now be made to the accompanying drawings, wherein:

FIGURE 1 is a perspective view of a preferred construction of the filter and feeder device, while FIGURE 2 is a longitudinal perspective sectional elevation of same taken on a line medially of the width of said device.

The casing generally indicated by the reference 3 is of clear plastic material and of rectangular open topped form having a lug 4 at one end and similar lugs 4 at one side so positioned to support the said casing 3 in a corner of an aquarium from the top of the walls thereof.

The said casing 3 contains a filtering chamber 5 which occupies the major portion thereof and has a series of upstanding ribs 6 extending along the bottom thereof and their purpose will be later explained. At one side of that end of the filter chamber 5 where the water enters there is a side water entry compartment 7 part of which is covered over at the top by a panel 8 and there is an air-water supply pipe 8A connected to the bottom thereof, and said pipe has a foot 9 to which an air supply pipe (not shown) is connected at 10 from an aerator or pump or any known form. The point of air-water entry is located under the panel 8 as seen in FIGURE 1, so that bubbles are broken in the entry flow into the compartment 7.

Towards the other end of the filtering chamber 5 there is a cross wall 11 which does not extend to the floor of the filter chamber 5 so that a flow opening is provided leading to a sub-chamber 12 formed between said cross wall 11 and an end wall 13 which has a water outlet opening 14 provided at the top of either side, and these openings 14 lead to a feeder compartment 15 which in this example is formed on the end of the casing 3.

The feeder compartment 15 has two overflow outlets 16 therein arranged at the top from which the aerated water supply overflows into the aquarium. The bottom portion of the feeder compartment 15 is of curved or hopper form with several medially positioned perforations 17 therein through which worms can hang so as to be readily available to fish for feed and by reason of this feed the worms are kept from deterioration.

Within the filtering chamber 5 a filter pad 18 of porous foam plastic is fitted in a readily removable manner so that it can be cleaned and replaced and forms the filtering medium. Said filter pad 18 has two cavities 19 therein to increase the filtering area. The under side of said pad 18 is kept spaced from the floor of the filtering chamber 5 by the before mentioned ribs 6 so as to facilitate the water flow and filtration.

A separate cover, not shown, may be fitted over the casing 3 or the open top covered by a panel of glass or other suitable material which is usually fitted over the top of an aquarium.

It is to be understood that while the casing and feeder compartment are preferably of clear plastic material any other material suited to the purpose may be used.

While the lugs 4 shown in the drawings provide a convenient way of supporting the casing, other means of support suited to the purpose may be used and the invention is not confined to the precise form shown in the drawings.

If desired water softening crystals may be placed at any appropriate location in the casing such as in the feeder compartment 15.

I claim:
1. A filter and feeder device for aquariums consisting of a casing of suitable material having an open top, and containing a main filter chamber having at a suitable location a water and air inlet from an aerator or pump, said chamber constituting a filter receptacle and adapted to receive therein a filtering medium in a removable manner, said casing having provision at the top for affixing it to the side or end of an aquarium within same, and having towards one end a cross wall with one or more outlet ports in the lower portion, and outwardly of said cross wall between it and that end of the casing a sub-chamber having one or more top overflow openings through which the bulk of the filtered water passes to an end compartment having at least one overflow outlet at the end thereof, and a number of perforations in the bottom through which worms for feeding purposes can pass, said end compartment forming a feeder for the fish and in some cases an egg hatching compartment.

2. A filter and feeder device for aquariums according to claim 1, wherein the water and air inlet from the aerator or pump enters the filter chamber through a side water entry compartment arranged alongside the said chamber, and said compartment having an opening therefrom to said chamber.

3. A filter and feeder device for aquariums according to claim 2, wherein the water entry compartment has its top covered over above the water entry from the aerator or pump.

4. A filter and feeder device for aquariums according to claim 1, wherein the provision for affixing the device to the side of an aquarium within same consists of a series of outturned spaced lugs arranged on the outside of the top edge of the casing of said device adapted to fit over the edge of the wall of an aquarium to hold the said device in a corner thereof.

5. A filter and feeder device for aquariums according to claim 1, wherein the filtering medium consists of a filter pad of porous foam plastic shaped to fit in the filter chamber.

6. A filter and feeder device for aquariums according to claim 5, wherein the filter pad has one or more cavities formed therein from one face thereof to increase the filtering area of said pad.

7. A filter and feeder device for aquariums according to claim 5, wherein the filter chamber has a series of upstanding ribs or the like to space the filter pad from said floor.

References Cited by the Examiner
UNITED STATES PATENTS

| | | | |
|---|---|---|---|
| 2,761,422 | 9/1956 | Martin | 119—5 |
| 2,981,228 | 4/1961 | Brandano | 119—2 |
| 2,984,207 | 5/1961 | Drake | 119—2 |
| 2,990,808 | 7/1961 | Rumonski | 119—1 |
| 3,095,852 | 7/1963 | Goldman | 119—3 |
| 3,140,691 | 7/1964 | Stark | 119—5 |

SAMUEL KOREN, *Primary Examiner.*

ALDRICH F. MEDBERY, *Examiner.*